United States Patent [19]

Eaton

[11] 3,876,242
[45] Apr. 8, 1975

[54] SAFETY TRAILER HITCH
[76] Inventor: Thomas R. Eaton, 248 Valle Vista, Danville, Calif. 94526
[22] Filed: June 10, 1974
[21] Appl. No.: 477,623

[52] U.S. Cl............................ 280/511; 280/511
[51] Int. Cl.............................................. B60d 1/12
[58] Field of Search........................... 280/511, 515

[56] References Cited
UNITED STATES PATENTS

| | | | |
|---|---|---|---|
| 3,307,857 | 3/1967 | Robertson | 280/511 |
| 3,479,057 | 11/1969 | Miller | 280/511 |
| 3,522,958 | 8/1970 | Lusigman | 280/511 |
| 3,677,564 | 7/1972 | Kothman | 280/511 X |
| 3,730,558 | 5/1973 | Litzenberger | 280/511 |
| 3,759,548 | 9/1973 | Kothman | 280/511 |

Primary Examiner—Leo Friaglia
Attorney, Agent, or Firm—Limbach, Limbach & Sutton

[57] ABSTRACT

The ball member of a trailer hitch is bolted to a tongue piece and is coaxially surrounded at its base by a raised rim integrally formed with the tongue piece. A ball cover is pivotally mounted on the tongue piece and is movable from an open position to a closed position covering the ball. Means are provided for locking the cover in the closed position so that the cover prevents the trailer socket member from disengaging from the ball and together with the rim prevents the ball from disengaging with the tongue piece either vertically or horizontally.

4 Claims, 2 Drawing Figures

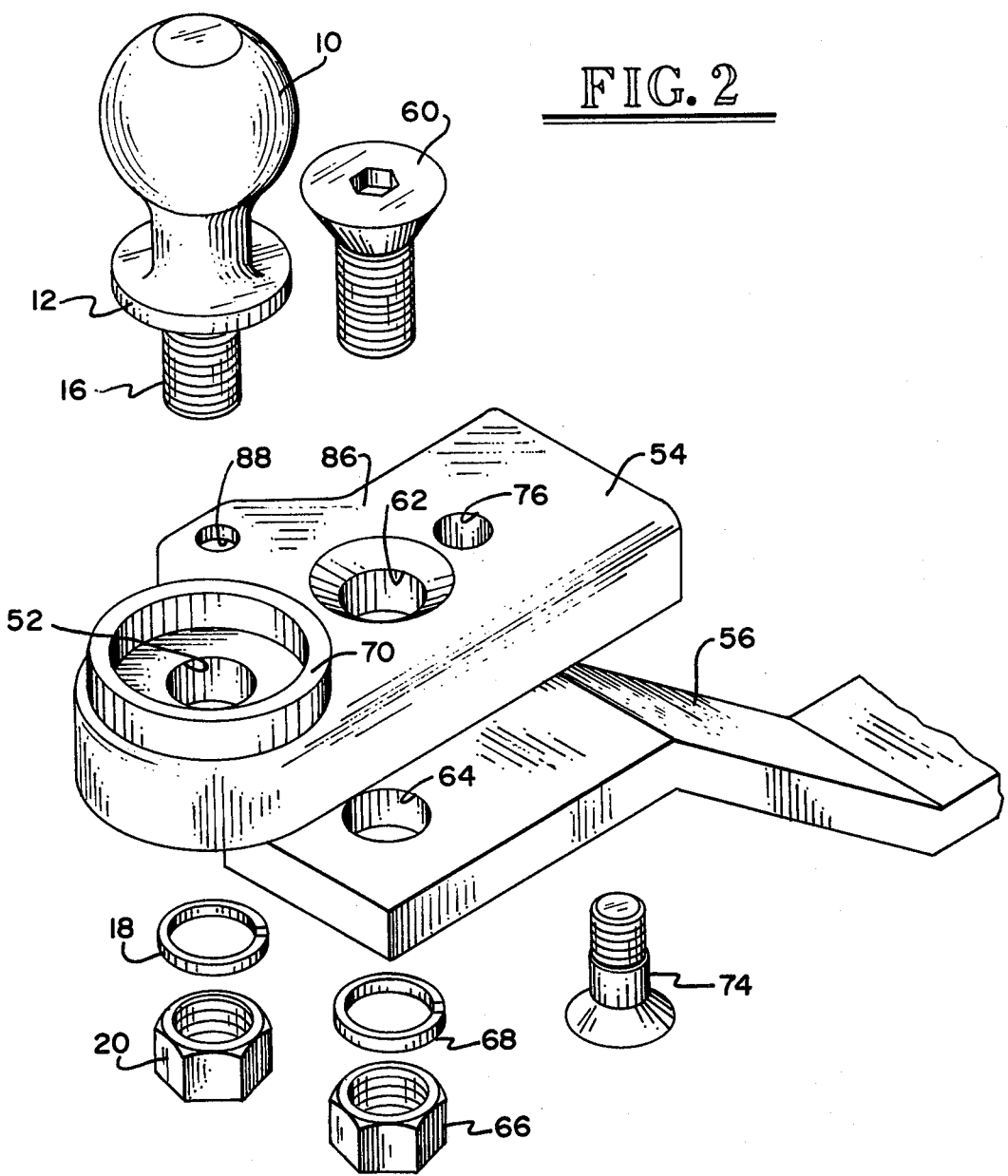

SAFETY TRAILER HITCH

BACKGROUND OF THE INVENTION

The invention relates to safety trailer hitches and more particularly to an improved ball-type trailer hitch.

In this type of hitch, a ball member is bolted to a towing bar which is secured to the towing vehicle. At the end of the trailer tongue piece is a socket which engages the ball hitch. One drawback of such trailer hitches is that should the ball somehow become unbolted from the towing bar, the trailer will break free, possibly causing injury to others and/or to the trailer and its contents. Since it is sometimes necessary in the use of such trailer hitches, as for example in the rental trailer hitch trade, to provide balls of varying sizes, the balls must be constructed in a manner such that they may be conveniently bolted or unbolted from the towing bar. This necessarily poses the danger that the ball will become unsecured from the towing bar either by a bolt shearing or because of an improperly tightened nut.

SUMMARY OF THE INVENTION

The above disadvantages of prior art ball-type trailer hitches are overcome by the present invention of a ball member integrally formed on a disc-shaped base which together are bolted to a tongue piece and including a raised rim integral with the tongue piece and coaxially surrounding the ball base, a rigid cover for the ball mamber, and means for pivotally mounting the cover on the tongue piece such that the cover is movable between a closed position covering the ball member and an open position clear of the ball member. Means are provided for locking the cover in its closed position.

In one preferred embodiment the cover further includes a horizontal support positioned at a level higher than the top of the ball member to protect the ball member from becoming entangled in extraneous objects, such as the bumpers of other vehicles, when the cover is in its closed position. The dimensions of the cover are such that when it is in its closed position, the space between it and the top of the ball member is just sufficient to accommodate the wall thickness of the trailer hitch socket. Thus, when the trailer socket is engaged with the ball member and the cover is closed, the ball member is prevented from disengaging in the vertical direction from the tongue piece. The purpose of the surrounding rim is to prevent the base of the ball member from moving horizontally in the event that the bolt portion of the ball member shears or otherwise disengages from the ball.

It is, therefore, an object of the present invention to provide a trailer ball hitch having a safety cover which prevents the ball from disengaging from the towing bar.

It is another object of the present invention to provide an improved ball type trailer hitch which prevents the ball member from disengaging from the towing bar in the horizontal and/or vertical direction on which it is mounted.

These and other features and advantages will become more apparent upon consideration of the following specification taken in conjunction with the accompanying drawings wherein similar characters of reference refer to similar structures in each of the several views.

BRIEF DESCRIPTION OF THE DRAWINGS

FIG. 2 is an exploded, perspective view of a safety trailer hitch according to a second embodiment of the invention.

DETAILED DESCRIPTION OF CERTAIN PREFERRED EMBODIMENTS OF THE INVENTION

Figure 1:
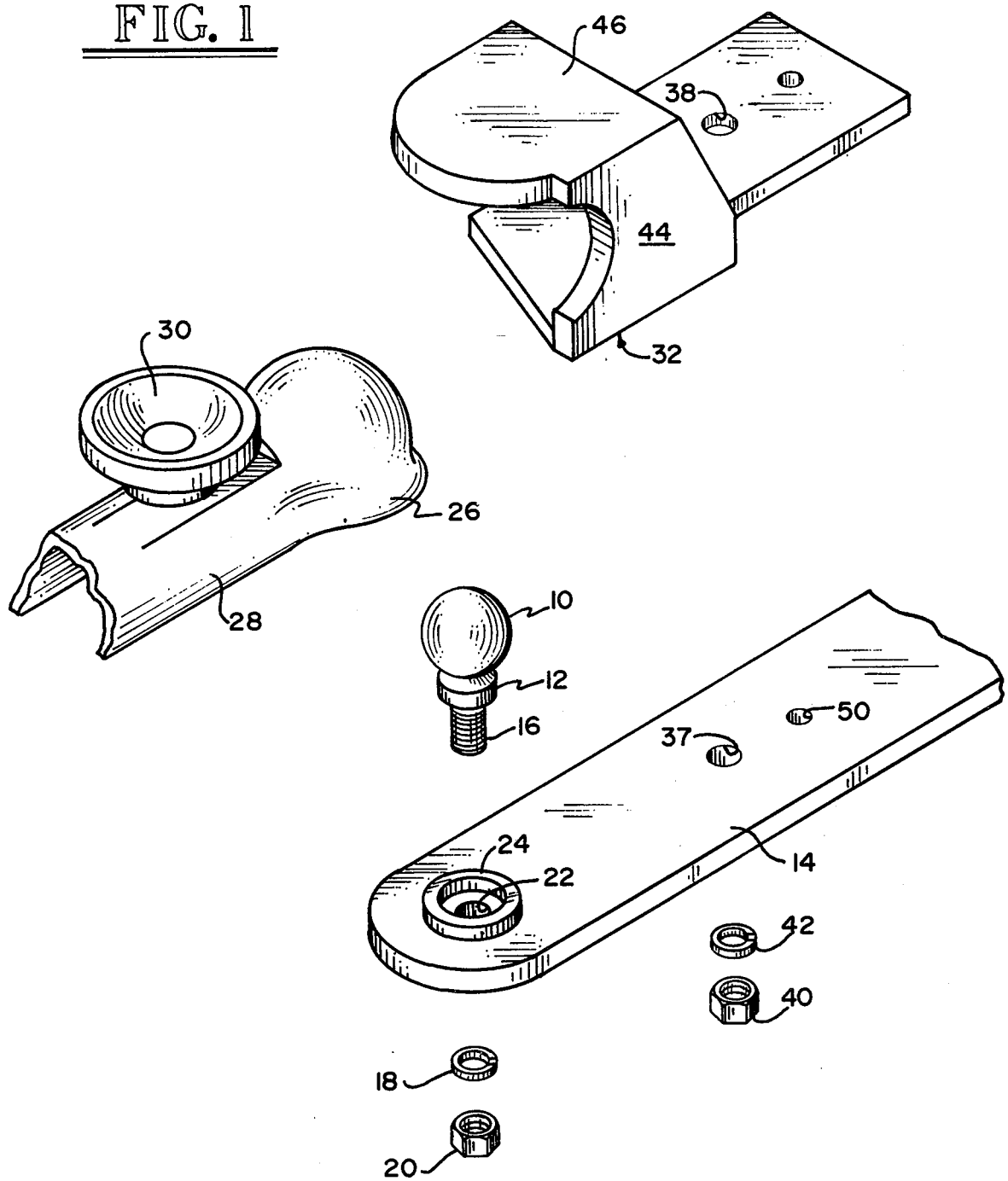
FIG. 1 is an exploded, perspective view of a safety trailer hitch according to a first embodiment of the invention.

Referring now more particularly to FIG. 1, a ball member 10 integrally mounted on a disc-shaped base 12 is bolted to a towing bar 14 by means of a threaded shaft 16, a lock washer 18 and a nut 20. The shaft 16 passes through a hole 22 in one end of the towing bar 14. The nut 20 and the lock washer 18 are threaded on the shaft 16 against the underside of the towing bar 14.

A raised rim 24 which is integral with the upper surface of the towing bar 14 coaxially surrounds the hole 22. The interior diameter of the rim 24 is just slightly larger than the diameter of the ball base 12. The height of the rim 24 is approximately the same as the thickness of the ball base 12. The ball 10 is designed to be engaged by a socket member 26 attached to a trailer tongue 28. A knob 30 on the trailer tongue 28 adjusts a clamp (not shown) within the socket member 26 which holds the socket member 26 in engagement with the ball 10.

In order to guard against the possibility that the ball 10 will lift away vertically from the towing bar 14 such as might happen, for example, if the shaft 16 sheared, a ball cover 32 is provided. The cover 32 has a first horizontal portion 34 which is pivotally attached to the upper surface of the towing bar 14 by means of a bolt 36 which passes through a hole 38 in the horizontal portion 34 and a hole 37 in the towing bar and engages a nut 40 and lock washer 42. A vertical portion 44 rises from the horizontal portion 34 and connects with a second horizontal portion 46 at a height sufficiently above the horizontal portion 34 to accommodate the height of both the ball 10 and the wall thickness of the socket member 26 when it is engaged with the ball 10.

A spring loaded locking pin 48 threaded through the horizontal cover member 34 engages with a hole or depression 50 in the upper surface of the towing bar 14 to hold the cover 32 in a closed position in which the cover 32 covers the ball 10. When in this closed position, the cover 32 prevents the ball 10 from disengaging from the towing bar 14 in the vertical direction and the rim 24 prevents the ball 10 from disengaging from the towing bar 14 in the horizontal direction as might happen if the bolt shaft 16 sheared.

Referring now more particularly to FIG. 2, a second embodiment of the invention is illustrated which is particularly suitable for convenient mounting on a conventional trailer towing bar. In the embodiment of FIG. 1 the standard one hole towing bar 14 must have additional holes drilled in it and the rim 24 must be welded to it. In this second embodiment, the threaded shaft 16 passes through a hole 52 in a channel-shapped tongue piece 54 and the nut 20 and lock washer 18 are threaded on the shaft 16 against the under surface of the tongue piece 54. The tongue piece 54 is attached to the conventional towing bar 56 by means of a socket head bolt 60 which passes through a hole 62 in the tongue piece 54 and a hole 64 in the towing bar 56. A locking nut 66 and a lock washer 68 are threaded on the bolt 60 against the underside of the towing bar 56.

The head of the bolt 60 is beveled and the hole 62 is countersunk so that the top surface of the bolt 60 is flush with the top surface of the tongue piece 54.

A raised rim 70 which is integral to the upper surface of the tongue piece 54 coaxially surrounds the hole 52. The interior diameter of the rim 70 is just slightly greater than the diameter of the base 12 and its height is approximately the thickness of the base 12.

A cover 72 is pivotally mounted on the tongue piece 54 by means of a socket head bolt 74 which passes upwardly through a hole 76 in the tongue piece 54 and a hole 78 in a horizontal portion 80 of the cover 72. A locking nut 82 is threaded on the shaft of the bolt 74 against the upper surface of the horizontal portion 80 of the cover 72.

The cover 72 is pivotal between an open position clear of the ball 10 and a closed position wherein a curved vertical portion 84, which rises from the horizontal portion 80, overhangs the top of the ball 10. When the cover 72 is in this closed position, the horizontal portion 80 also covers the top of the flush-mounted bolt 60. The locking nut 66 is of the type which either has jamming threads or is crimped onto the bolt 60. Thus, when the cover 72 is in its closed position, turning of the nut 66 only serves to rotate the bolt 60, thereby preventing the tongue piece 54 from being disengaged from the towing bar 56 by unauthorized persons.

The tongue piece 54 is provided with a horizontal lip 86 having a hole 88. A corresponding horizontal lip (not shown) extends from the horizontal portion 80 of the cover 72, in a location such that when the cover 72 is in its closed position, the hole 88 is aligned with the corresponding hole in the cover lip. A bolt, lock or other suitable fastening device can then be inserted through the aligned holes in the lips to lock the cover 72 in its closed position.

The head of the bolt 74 is also beveled and countersunk in the hole 76. The nut 82 is likewise of the type which has jamming threads or is crimped onto the shaft of the bolt 74. Thus, when the tongue piece 54 is assembled against the towing bar 56, the bolt 74 and the nut 82 may not be disengaged from each other since rotating the nut 82 merely serves to rotate the bolt 84 in the hole 76. The purpose of this beveled and countersunk bolt arrangement is to prevent the tongue piece 54 and the cover 72 from being removed by unauthorized persons from the towing bar 56. The bolts 60 and 74 are preferably made of high strength steel. By locking the cover 72 in its closed position, access to the nut 60 is closed which in turn means that the tongue piece 54 and the cover 72 may also not be removed. If the trailer socket is engaged with the ball 10 then locking the cover also locks the trailer onto the towing vehicle.

As with the embodiment of FIG. 1, the purpose of the rim 70 and the cover 72 is to prevent the ball 10 from becoming disengaged from the tongue piece 54 in the vertical and/or horizontal direction.

The cover 72 is also provided with a second vertical member 90, which is perpendicular to the vertical portion 84 and is attached to the horizontal portion 80. The upper edge of the vertical member 90 joins with the topmost portion of the first vertical portion 84 to provide a horizontal support 92 positioned at a level higher than the top of the ball 10. The purpose of this horizontal support 92 is to prevent the ball 10 from becoming engaged with an extraneous object, such as the bumper of another vehicle when the cover 72 is in its closed position. In practice, if the towing vehicle backed into the bumper of another vehicle, the bumped vehicle bumper would ride on the horizontal surface 92 over the ball 10 and could therefore be easily disengaged.

While the above embodiments have been described with reference to a particular type of ball hitch, namely a ball mounted on a base to which is attached a threaded shaft, it should be apparent that the invention is equally applicable to other types of ball hitches such as the type in which a ball member integrally mounted on a base is attached to the tongue piece by means of a bolt which screws into the base and the ball.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An improved trailer ball hitch of the type having the ball and a base bolted on a tongue piece wherein the improvement comprises a rigid cover for the ball, means for pivotally mounting the cover on the tongue piece such that the cover is pivotable between a closed position covering the ball and an open position clear of the ball, means for locking the cover in its covering position and a raised rim integral with the tongue piece and coaxially surrounding the ball base.

2. An improved trailer ball hitch as recited in claim 1 wherein the cover further comprises a horizontal support positioned at a level higher than the top of the ball to prevent the ball from being entangled with external objects from above when the cover is in its closed position.

3. An improved trailer ball hitch as recited in claim 1 further comprising a towing bar for mounting on a vehicle and means for detachably mounting the tongue piece on the towing bar, the detachable mounting means being non-detachable when the cover is in its closed position.

4. An improved trailer ball hitch of the type having the ball and a base bolted on a tongue piece wherein the improvement comprises a rigid cover for the ball, means for pivotally mounting the cover on the tongue piece such that the cover is pivotable between a closed position covering the ball and an open position clear of the ball, means for locking the cover in its covering position, a towing bar for mounting on a vehicle and means for detachably mounting the tongue piece on the towing bar, the detachable mounting means being non-detachable when the cover is in its closed position, and wherein the tongue piece and towing bar have a set of aligned holes, the detachable mounting means includes a flush-mounted bolt passing through the aligned holes and whose head is covered by the cover when the cover is in its closed position, and a locking nut threaded on the end of the bolt and against the towing bar.

* * * * *